US011089787B2

(12) United States Patent
Tonelli

(10) Patent No.: US 11,089,787 B2
(45) Date of Patent: Aug. 17, 2021

(54) UNIT FOR FORMING SHORT PASTA

(71) Applicants: Leonardo Tonelli, Granarolo Emilia (IT); Dante Tonelli, Granarolo Emilia (IT)

(72) Inventor: Dante Tonelli, Granarolo Emilia (IT)

(73) Assignees: Dante Tonelli, Granarolo Emilia (IT); Leonardo Tonelli, Granarolo Emilia (IT)

( * ) Notice: Subject to any disclaimer, the term of this patent is extended or adjusted under 35 U.S.C. 154(b) by 0 days.

(21) Appl. No.: 16/858,971

(22) Filed: Apr. 27, 2020

(65) Prior Publication Data

US 2020/0345015 A1 Nov. 5, 2020

(30) Foreign Application Priority Data

Apr. 30, 2019 (IT) .......................... 102019000006443

(51) Int. Cl.
*A21C 3/04* (2006.01)
*A23L 7/109* (2016.01)
*A21C 11/22* (2006.01)

(52) U.S. Cl.
CPC ................ *A21C 3/04* (2013.01); *A21C 11/22* (2013.01); *A23L 7/109* (2016.08)

(58) Field of Classification Search
CPC ........... A21C 3/04; A21C 11/22; A21C 11/10; A21C 3/06; A23L 7/109
See application file for complete search history.

(56) References Cited

U.S. PATENT DOCUMENTS

| 3,599,579 A | 8/1971 | Paaskesen et al. |
| 8,668,485 B1 | 3/2014 | Emerson et al. |
| 2004/0050258 A1 | 3/2004 | Maniak et al. |
| 2007/0184161 A1 | 8/2007 | McDonnell et al. |

(Continued)

FOREIGN PATENT DOCUMENTS

| EP | 2227968 A1 | 9/2010 |
| IT | 1233302 B | 3/1992 |

(Continued)

OTHER PUBLICATIONS

Italian Search Report dated Nov. 26, 2019 from counterpart Italian App No. 2019000006443.

(Continued)

*Primary Examiner* — Nahida Sultana
(74) *Attorney, Agent, or Firm* — Shuttleworth & Ingersoll, PLC; Timothy J. Klima

(57) ABSTRACT

Described is a unit for forming short pasta comprising at least one pin rotatable in a first direction of rotation about a first axis of rotation and at least one roller rotatable in a second direction of rotation opposite the first direction of rotation about a second axis of rotation parallel to the first axis of rotation; the roller is movable along a first operating direction at right angles to the first and the second axes of rotation between a non-operating position and an operating position alongside the pin; the forming unit comprises a punch movable in another operating direction at right angles to the first operating direction, to the first axis of rotation and to the second axis of rotation between a retracted position and an extracted position for feeding a piece of sheet to the pin and to the roller.

14 Claims, 5 Drawing Sheets

(56) References Cited

U.S. PATENT DOCUMENTS

2012/0079933 A1* 4/2012 Johansson ............... B26F 1/384
83/887
2015/0245625 A1* 9/2015 Bertuzzi ................. A21C 11/10
83/209

FOREIGN PATENT DOCUMENTS

IT        1238791 B      3/1992
IT        MI931498 A1    1/1995

OTHER PUBLICATIONS

European Search Report dated Dec. 15, 2020 from counterpart European Patent Application No. 20171486.2.

* cited by examiner

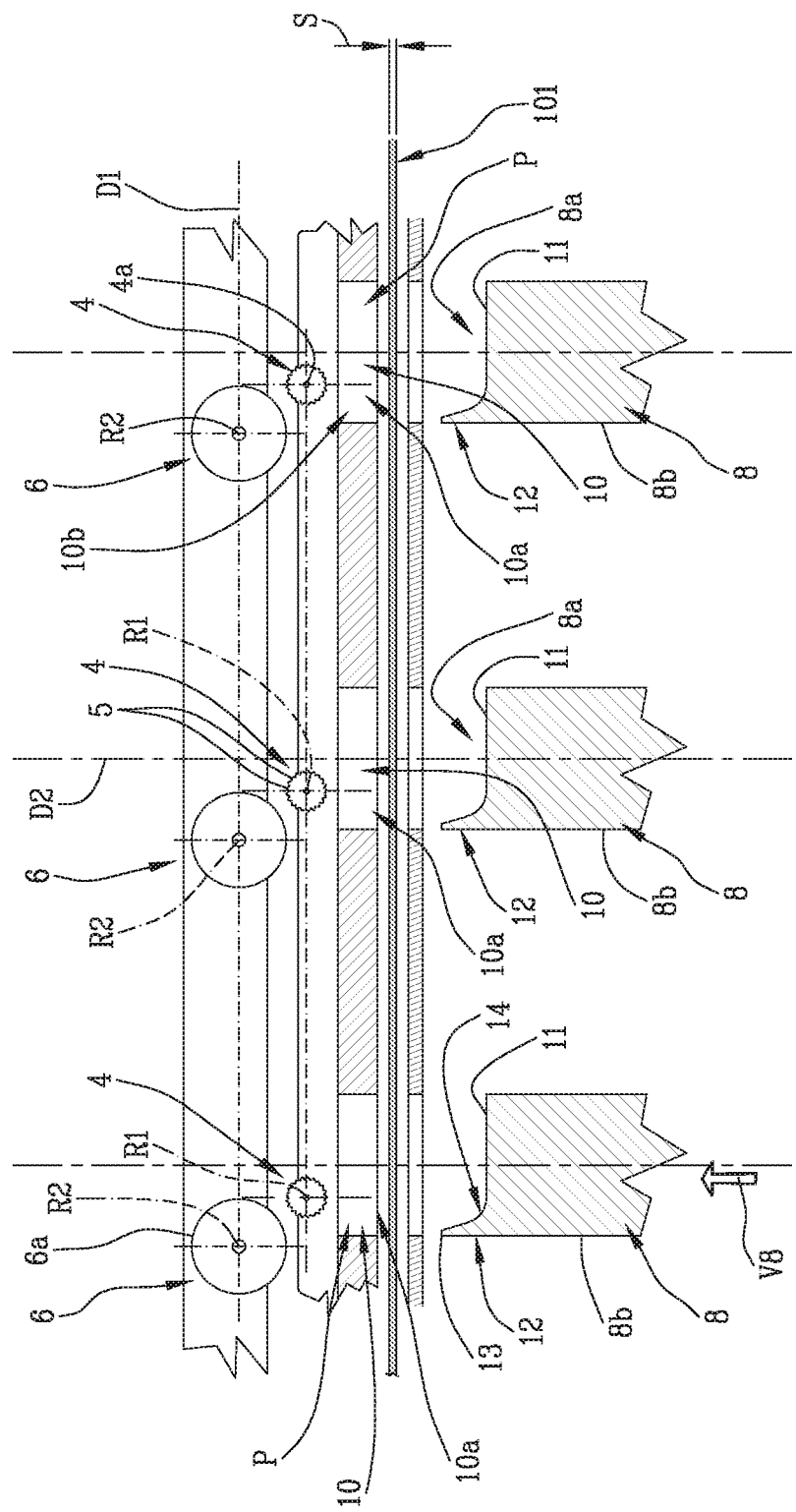

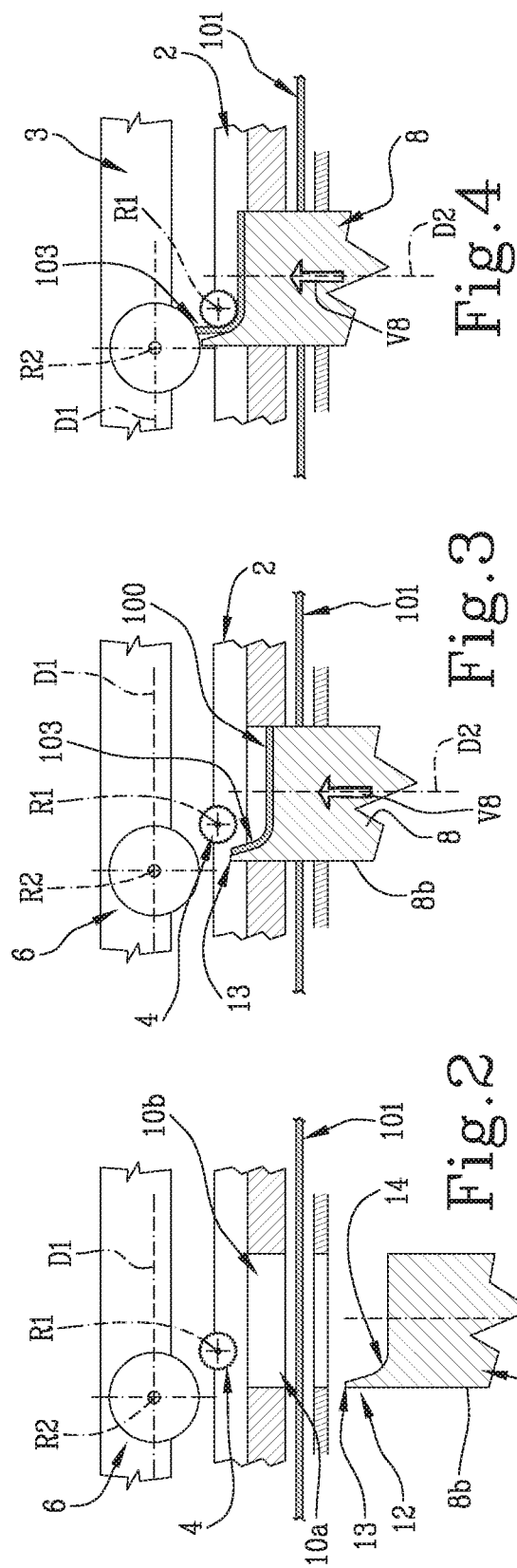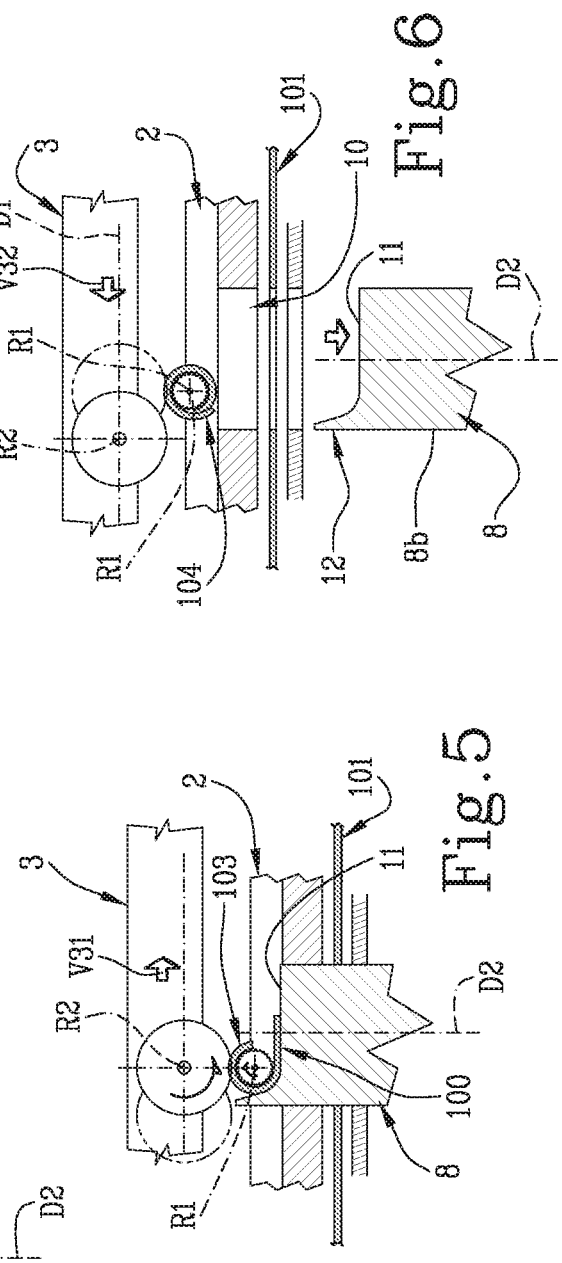

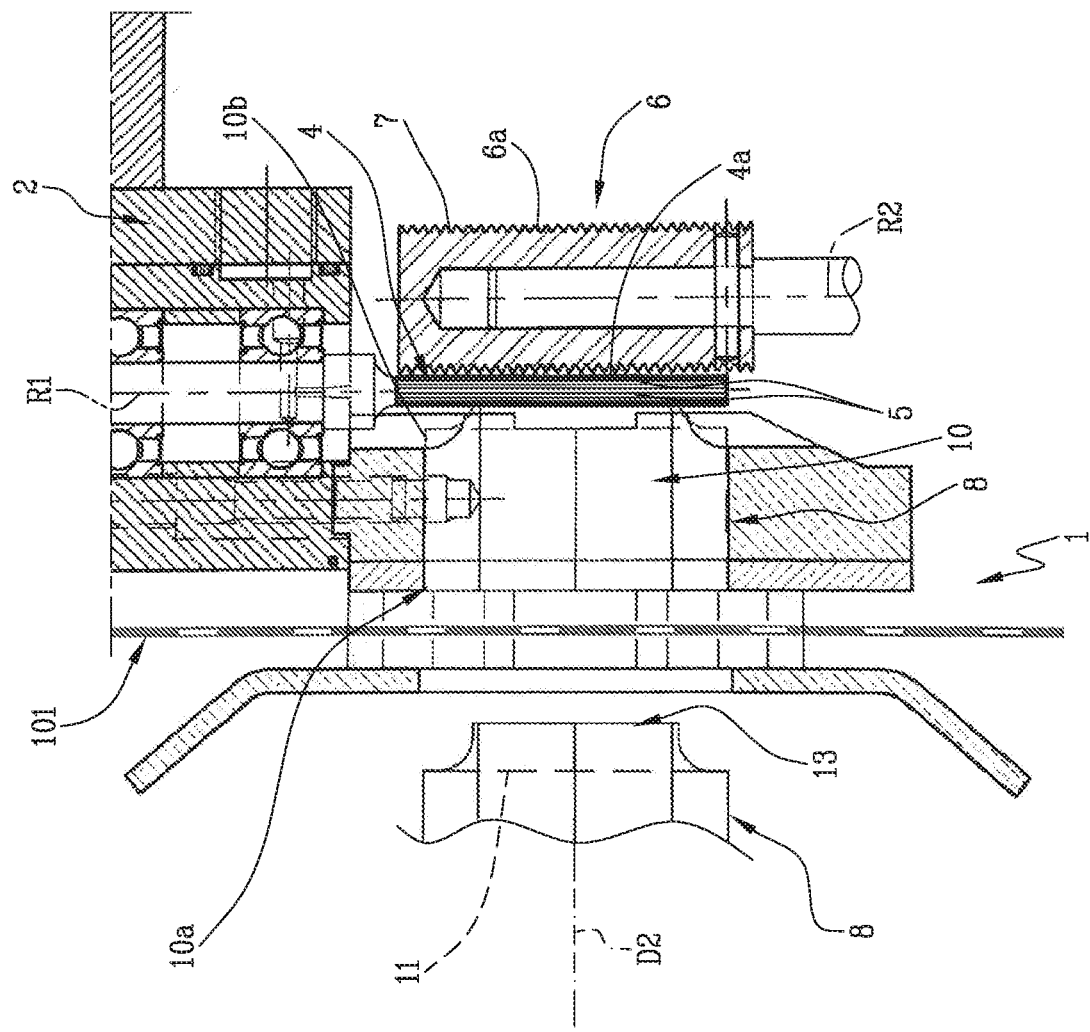

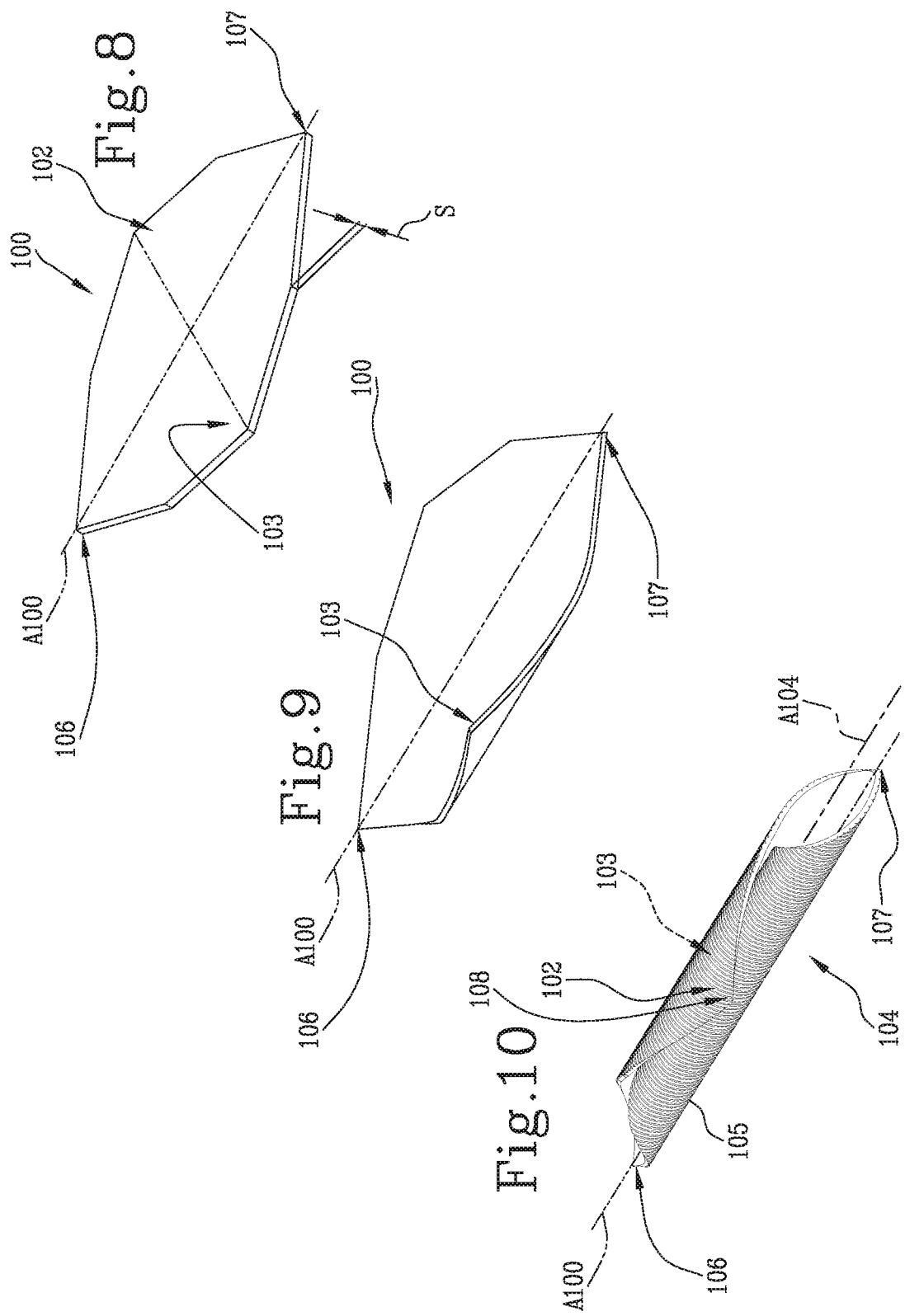

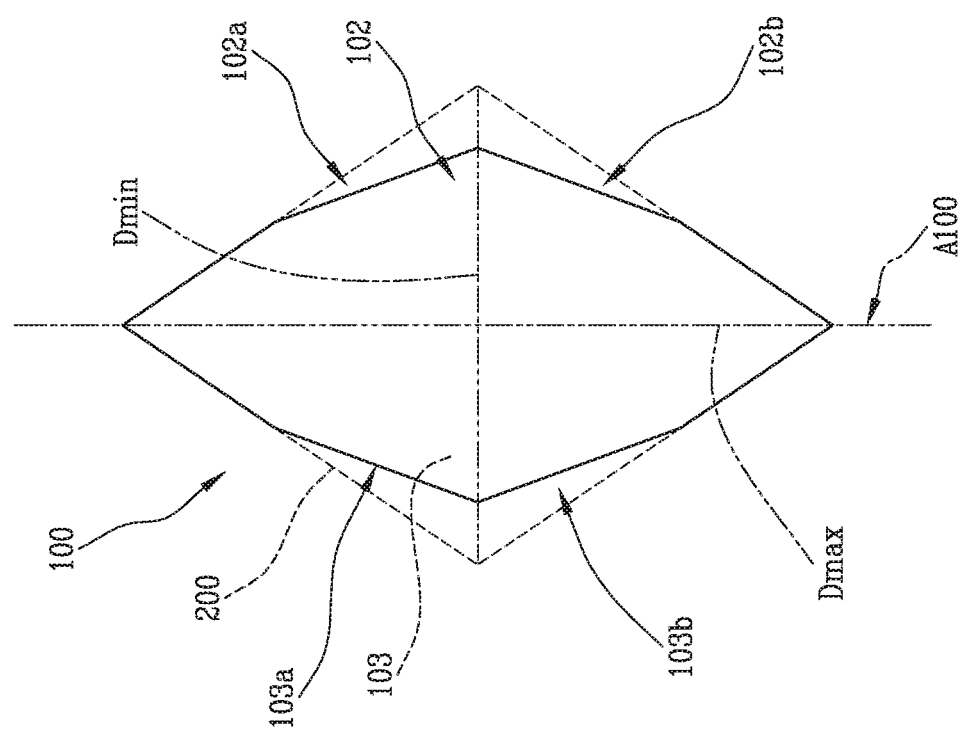

UNIT FOR FORMING SHORT PASTA

This application claims priority to Italian Patent Application 102019000006443 filed Apr. 30, 2019, the entirety of which is incorporated by reference herein.

This invention relates to a unit for forming short pasta and in particular a unit for forming a format of pasta consisting of a piece of pasta sheet in a substantially small lozenge shape, wrapped on itself with superposing of two opposite flaps.

Such a type of pasta is known, for example, with the name "garganello" to which reference is hereinafter made without thereby limiting the scope of the invention.

The garganello type pasta can in general be made by hand from a sheet of pasta which is cut into square pieces. Each piece is rolled up on a rod until two opposite flaps of it are superposed and it is then pressed on a weaving comb, from which also derives the name of "maccheroncini al pettine" (comb pasta).

There are also prior art forming units for industrial production of this type of pasta.

A widespread example of a machine for forming garganello pasta comprises a forming unit starting from pieces of sheet with a substantially square shape.

The unit comprises a moving belt on which the pieces of sheet are positioned with a scored face which rests resting on the belt.

The belt intercepts a pin suitably positioned which curves the belt and determines the rolling of each piece on itself.

A defect of this forming unit lies in the fact that the pieces on the belt are not stationary and do not all arrive in the same position at the moment of rolling, overlappings thus being able to form between the flaps of the individual product which differ from product to product.

Moreover, the conveyor belt is compliant and the joint at the superposed flaps, as it cannot be pressed, remains relatively large and is thereby harder, at the end of the cooking of the pasta, than the rest of the product.

In this context, the technical purpose which forms the basis of the invention is to provide a unit for forming short pasta which overcomes the above-mentioned drawbacks.

An aim of the invention is to provide a unit for forming short pasta which allows products which are all very similar to each other to be obtained.

Another aim of the invention is to provide a unit for forming short pasta which allows products with a substantially uniform thickness along their entire extension to be obtained.

Other features and advantages of the solution are more apparent in the non-limiting description of a unit for forming short pasta as illustrated in the accompanying drawings, in which:

FIG. 1 shows a schematic view from below of a unit for forming short pasta according to the invention;

FIGS. 2 to 6 show schematic views from below of a detail of the unit for forming short pasta according to the invention in a succession of operating configurations for forming a garganello;

FIG. 7 shows a schematic side view partly in cross section of a detail of a unit for forming short pasta according to the invention;

FIGS. 8 to 10 illustrate a piece of pasta sheet in a succession of processing operations which lead to the formation of a garganello;

FIG. 11 is a schematic plan view of the piece of pasta of FIG. 7.

With reference to the accompanying drawings, the numeral 1 denotes a unit for forming short pasta according to the invention.

The format of pasta obtained with the unit 1 consists of a piece 100, illustrated for example in FIG. 8, obtained from a sheet 101 of pasta, wrapped around itself with superposing two of its opposite flaps 102, 103 as shown in FIG. 10.

The piece 100 has a main axis of extension A100 and two tips 106, 107, which define the longitudinal ends of the piece 100, aligned along the axis A100.

The sheet 101, in the preferred embodiment, is an industrial sheet typically also referred to as "continuous sheet"; for simplicity, generic reference is made below to a sheet 101 from which the pieces to be wrapped on themselves are cut.

The piece 100, which defines a semi-finished product in the production of the pasta, substantially has the shape of a small lozenge and is preferably octagonal so as to have less overlapping of sheet once wound on itself. The rolled up piece is denoted by the numeral 104 and corresponds to a piece of pasta of the type also indicated by the name "garganello".

The unit 1 comprises a main frame 2 and a unit 3 movable relative to the frame 2, indicated for example in FIGS. 4, 5 and 6.

Preferably, the unit 3 is slidably constrained to the frame 2.

The unit 1 comprises a plurality of pins 4, of which only three are illustrated in the example embodiment of FIG. 1, rotatable in a first direction V1 of rotation about a first axis R1 of rotation; with reference to the accompanying drawings, the direction of rotation V1 is clockwise.

For simplicity, reference is also made below to a single pin 4 since preferably all the pins 4 of the unit 1 are the same.

The pin 4 is preferably in the form of a right-angled cylinder whose axis corresponds to the first axis of rotation R1.

An outer diameter of the pin 4 substantially corresponds to an inner diameter of the garganello 104.

The pin 4 has, preferably in the example illustrated, on a relative outer surface 4a, a plurality of teeth 5 which form a sort of knurling to better pull the piece 100 as described in more detail below.

In alternative embodiments not illustrated, the pin 4 is without teeth, may be completely smooth or only partly smooth and/or may have a surface machining or treatment to increase the roughness and therefore the adherence with the piece 100, according to the features of the sheet being processed, as it may be, for example, made with hard wheat semolina, eggs and water or hard wheat semolina and only water; semolina with the addition of freeze-dried spinach, with wholemeal semolina, of spelt, etc.

In the example illustrated, the teeth 5 extend preferably parallel to the first axis R1 of rotation.

The unit 1 comprises a plurality of rollers 6, of which only three are illustrated in the example embodiment of FIG. 1, one for each pin 4.

The rollers 6 are rotatable in a second direction V2 of rotation, opposite the first direction V1 of rotation, about a second axis of rotation R2 parallel to the first axis of rotation R1; with reference to the accompanying drawings, the direction of rotation V2 is anticlockwise.

For simplicity, reference is also made below to a single roller 6 since preferably all the rollers 6 of the unit 1 are the same.

The roller 6 is preferably in the form of a right-angled cylinder whose axis corresponds to the second axis of rotation R2.

In the example illustrated, the roller 6 has rectilinear generatrices whilst in alternative embodiments the generatrices of the roller 6 might have non-linear profiles.

Preferably, the roller 6 has, on its outer surface 6a, a scoring 7.

In the example illustrated, the crests of the scoring 7 extend perpendicularly to the generatrices of the roller 6 itself.

In alternative embodiments, the crests of the scoring 7 have a helical extension.

The scoring 7 is used, amongst other things, to imprint on the outer surface of the garganello 104 a corresponding scoring 105 which is typical of it.

The scoring 105 also gives the garganello 104 a greater capacity to retain the sauce and completes the process for homogenizing the pasta sheet 101.

Each roller 6 is movable relative to the corresponding pin 4, in an operating direction D1 at right angles to the first and second axes of rotation R1, R2, between a non-operating position and an operating position alongside the pin 4.

When the roller 6 is in the operating position alongside the pin, the outer surfaces 4a, 6a of the pin 4 and of the roller 6 are spaced by a distance D.

The distance D is preferably adjustable as desired, that is to say, it can be set between 0 and a value of the order of magnitude of the thickness S of the sheet 101.

The distance D is adjustable for tolerance requirements and also on the basis of the thickness of the sheet 101.

In the preferred embodiment illustrated as an example, the rollers 6 are installed on the above-mentioned movable unit 3 which moves them between the respective non-operating and operating positions.

In particular, the pins 4 are aligned along the operating direction D1 and are supported by the above-mentioned frame 2, whilst the rollers 6 are aligned according to the operating direction D1 and supported by the movable unit 3.

The unit 3 is movable along the operating direction D1 in the direction V31 to move the rollers 6 to the respective operating positions and in the direction V32 to move the rollers 6 to the respective non-operating positions.

The unit 1 comprises, for each pin 4 and the corresponding roller 6, a cutting punch 8 movable between a retracted position and an extracted position for feeding a piece 100 of the sheet 101 to the respective pin 4 and roller 6.

The unit 1, as described in more detail below, defines a path P for feeding the piece 100 upstream of the pin 4 in a direction V8 for feeding the punch 8. In practice, the punch 8 cuts the piece 100 and feeds it to the pin 4 along the path P.

For simplicity, reference is also made below to a single punch 8 since the punches 8 of the machine 1 are preferably all equal to each other.

The punch 8, preferably supported by a slider slidable on the frame 2, cuts the piece 100 from the sheet 101 and feeds it to the respective pin 4.

The punch 8 is movable according to a second operating direction D2 at right angles to the first operating direction D1, to the first axis R1 of rotation and to the second axis R2 of rotation.

The punch 8 preferably has an octagonal plan shape, at right angles to the second operating direction D2, the cutting profile of which substantially corresponds to the desired shape of the piece 100 which therefore also has an octagonal shape.

FIG. 10 shows a preferred embodiment of the piece 100 which corresponds to the plan shape of the punch 8.

The piece 100 is, in a preferred embodiment, like a rhombus 200, the sides of which are chamfered, each with respective chamfers 102a, 102b, 103a, 103b to define the above-mentioned flaps 102, 103.

The chamfers 102a, 102b, 103a, 103b are substantially at the ends of a first diagonal or smaller diagonal Dmin of the rhombus 200.

As illustrated, in the preferred embodiment in the example, the chamfers 103a and 103b are symmetrical with respect to the smaller diagonal Dmin of the rhombus 200.

The chamfers 102a and 102b are symmetrical with respect to the smaller diagonal Dmin of the rhombus 200.

The chamfers 102a and 103a are symmetrical with respect to a second diagonal or larger diagonal Dmax of the rhombus 200.

The chamfers 102b and 103b are symmetrical with respect to the larger diagonal Dmax of the rhombus 200.

In a preferred embodiment, the rhombus 200 has right angles, that is to say, it is a square and the first and second diagonals are equal to each other. Considering the chamfers 102a, 102b, 103a and 103b, the corners remain straight at the tips 106 and 107.

In alternative embodiments not illustrated, the punch 8 has different shapes, for example of a dodecagonal polygon, preferably having the same proportion, of the octagonal punch, between the perpendicular diagonals and the same angles at the ends of the latter.

The unit 1 comprises a die 9, fixed to the frame 2 and acting in conjunction with the punch 8 to cut the piece 100 of sheet when the punch 8 passes from the retracted position, shown for example in FIGS. 1 and 2, to the extracted position, shown for example in FIG. 4.

The die 9 defines a conduit 10, inside of which slides the punch 8, which delimits, at least partly, the feed path P of the piece 100. In the preferred embodiment illustrated, the unit 1 comprises as many dies 9 as there are punches and pins, that is to say, a single die with a plurality of conduits 10.

Each conduit 10 has an inlet 10a, whose edge defines with the profile of the corresponding punch 8 a line for cutting the piece 100, and an outlet 10b, located substantially at the pin 4.

The conduit 10 has a cross section at right angles to the second operating direction D2 shaped to match an outer profile of the corresponding punch 8 slidable in the die also to define the above-mentioned cutting line.

The unit 1 is configured in such a way that, in use, the sheet 101 extends substantially at right angles to the second operating direction D2 at the inlet 10a of the duct 10 in the die 9 as schematically illustrated in the accompanying drawings.

With reference in particular to FIGS. 1 to 6, it may be noted that, in the preferred embodiment illustrated, the punch 8 has a face 8a for engaging with the sheet 101.

Preferably, the face 8a extends mainly in a plane at right angles to the second operating direction D2, whilst in alternative embodiments it may also have other extensions.

In the example illustrated, the face 8a comprises a flat portion 11 extending at right angles to the operating direction D2.

The face 8a has a cusp 12 extending mainly according to the second operating direction D2 whose outer profile or cutting edge defines, in use, the flap 103 of the corresponding piece 100 when the punch 8 intercepts the sheet 101.

The cutting edge of the cusp 12 comprises a stretch 13 which extends preferably along a direction parallel to the axes of rotation R1, R2.

The cusp 12 comprises a curvilinear surface 14 which defines, at least partly, the face 8a of the punch 8.

The curved surface 14 has a concavity facing towards the respective pin 4 and has generatrices preferably parallel to the first and second axes of rotation R1, R2.

The cusp 12 is an extension, along the direction D2, of one side 8b of the punch 8; the free end of the extension defines the cutting edge of the cusp 12.

The curved surface 14 connects, in practice, the cutting edge of the cusp 12 with the flat portion 11 of the face 8a.

With reference to the example of FIG. 4, it may be noted that the curved surface 14, or at least part of it, is spaced from the respective pin 4, when the punch 8 is in the extracted position, by a distance in the order of magnitude of the thickness S of the sheet 101.

This distance is adjustable, in particular during an installation by the unit 1.

The unit 1 may be installed in a system for making pasta wherein there are normally provided, schematically, a mixer, at least one sheet making machine, for example with rollers, a system for feeding the sheet to the forming unit.

With reference in particular to FIG. 7, the sheet 101 is fed from above to the unit 1 in an intermittent fashion.

At each operating step, the sheet 101 moves forward, that is to say, drops down as shown in FIG. 7, the punches 8, of which only one is shown in the drawings, move from the retracted position to the extracted position cutting from the sheet 101 the corresponding piece 100 which is fed to the respective pin 4, as schematically illustrated in FIGS. 2 to 4.

With the punch 8 in the extracted position, the piece 100 encounters the respective pin 4 which is in rotation.

As illustrated in FIG. 4, the rotation of the pin 4, pulling the piece 100 causes the flap 103 to be detached from the face of the punch 8 in such a way as to form a sort of ear.

The unit 3 moving in the direction V31 moves the roller 6 to the operating position alongside the pin 4 where it intercepts the ear and contributes to a rolling of the piece 100 around the pin 4.

At the end of the rolling, that is, in the garganello 104, the flap 102 is superposed on the flap 103 for approximately 180 sexagesimal degrees.

The curls of the scoring 7 on the outer surface of the roller 6 form a corresponding scoring on the outer surface of the piece 100 wound on the pin.

The relative position of the roller 6 and of the pin 4 also determines a flattening 108 of the garganello, in particular of the portion in which the flaps 102 and 103 are superposed.

Whilst the piece 100 is engaged between the roller 6 and the pin 4, the punch 8 returns to the non-operating position.

Advantageously, where the sheet is surmounted, at the flattening 108, since it is flattened between a pin and a substantially rigid roller, the thickness of the double pasta is comparable with the thickness of the single sheet, thus guaranteeing almost uniform cooking of the finished product.

In practice, the thickness of the garganello 104 at the flattening 108 is less than twice the thickness S of the sheet 101 despite the superposing and is substantially equal to the thickness S of the sheet 101.

The garganello 104, that is, the rolled up piece 100, has a main axis A104.

Once the garganello 104 is rolled up, the unit 3 withdraws, the rollers 6 free the corresponding products which are free to fall from the respective pin 4, for example on a conveyor belt not illustrated.

It should be noted that the octagonal shape of the piece 100 makes it possible to obtain less superposing of the sheet compared with a square shape; in that way, the wrapping of the piece is speeded up as well as the falling of the garganello ring from the pin.

More specifically, the flattening 108 determines, in effect, an elongation of the average circumference of the garganello 104 which is therefore widened relative to the pin 4 and free to fall.

In practice, if a garganello 104 is unrolled, the smaller diagonal of the piece thus obtained would be longer than the smaller diagonal Dmin of the piece 100.

This shape also makes it possible to limit the increase in volume of the rolled-up garganello, reducing the packaging and distribution costs.

The piece 100 is substantially guided from the cut until engaging with the pin so the pieces all arrive at the same position when rolling and the products obtained in this way are equal to each other.

Advantageously, with reference to FIG. 10, it may be noted that the axis A104 of the garganello 104 is substantially parallel to the axis A100 of the piece 100.

The tips 106, 107 of the piece 100 are then aligned along a direction corresponding to the direction of the axis A104 of the garganello 104.

Advantageously, the pieces of garganello pasta 104 obtained with the forming unit 1 are all substantially equal and with a regular shape as mentioned above.

This result is possible thanks to the unit 1 in which the piece 100 is always guided from the cutting to the rolling and is never free to adopt uncontrolled positions.

The forming unit preferably cuts a smooth sheet which is scored during the rolling/pressing operation. This operation also completes a process of mixing and homogenizing the sheet 101 which only after the formation of the garganello 104 adopts a uniform colour and appearance.

The rigidity of the system and the tangential thrust applied by the rollers 6, as well as giving the scoring 105 to the garganello 104, wrinkles the surface of the garganello 104 making it rougher and more receptive to the sauce.

The invention claimed is:

1. A unit for forming short pasta comprising
at least one pin rotatable in a first direction of rotation about a first axis of rotation;
at least one roller rotatable in a second direction of rotation opposite the first direction of rotation about a second axis of rotation parallel to the first axis of rotation,
said at least one roller being movable along a first operating direction at right angles to the first and the second axes of rotation between a non-operating position and an operating position alongside said at least one pin,
at least one punch movable in another operating direction at right angles to the first operating direction, to the first axis of rotation and to the second axis of rotation between a retracted position and an extracted position for feeding a piece of sheet to said at least one pin and to said at least one roller,
at least one die acting in conjunction with said at least one punch for cutting said piece of sheet from a sheet when said at least one punch passes from the retracted position to the extracted position, said forming unit defining a feed path of said piece upstream of said at least one pin according to a feed direction of said at least one die.

2. The forming unit according to claim 1, wherein said at least one punch has an engaging face for engaging with said sheet extending in a plane at right angles to said second operating direction, said engaging face having a cusp extending according to said second operating direction to intercept a first flap of said piece of sheet.

3. The forming unit according to claim 2, wherein said cusp comprises a cutting edge extending along a direction parallel to said first and second axes of rotation.

4. The forming unit according to claim 3, wherein said cusp comprises a curved surface, which defines at least partly said engaging face for engaging the at least one punch with the sheet, having a concavity directed towards said at least one pin and generatrices parallel to said first and second axes of rotation.

5. The forming unit according to claim 4, wherein said curved surface is spaced from said at least one pin when the at least one punch is in the extracted position by a distance which can be set to a value of between 0 and a value in the order of magnitude of a thickness of the sheet.

6. The forming unit according to claim 1, wherein said at least one die defines a conduit having an inlet and an outlet, said outlet being located at said at least one pin, said conduit defining at least partly said feed path, said at least one punch sliding into said conduit.

7. The forming unit according to claim 6, wherein said conduit has a cross section at right angles to said second operating direction complementary to an outer profile of said at least one punch.

8. The forming unit according to claim 1, wherein said at least one punch has a plan at right angles to said second operating direction with an octagonal shape, a cutting profile of said at least one punch corresponding to said plan.

9. The forming unit according to claim 1, wherein said at least one pin is formed as a straight cylinder having an axis corresponding to the first axis of rotation.

10. The forming unit according to claim 1, wherein said at least one pin has on its outer surface a plurality of teeth extending parallel to said first axis of rotation.

11. The forming unit according to claim 1, wherein said at least one roller is formed as a straight cylinder having an axis corresponding to the second axis of rotation.

12. The forming unit according to claim 1, wherein said at least one roller has a scoring on its outer surface.

13. The forming unit according to claim 1, comprising a frame supporting said at least one pin and a movable unit connected in a slidable fashion to said frame and supporting said at least one roller for moving said at least one roller between the non-operating position and the operating position and vice versa.

14. The forming unit according to claim 13, comprising a plurality of said at least one pin aligned according to said first operating direction and supported by said frame and a plurality of said at least one roller aligned according to the first operating direction and supported by said movable unit.

* * * * *